JOSEPH J. SLIWKOWSKI
INVENTOR.

BY Charles C. Krawczyk

ATTORNEY

United States Patent Office 3,513,467
Patented May 19, 1970

3,513,467
FUNCTION GENERATOR CIRCUIT
Joseph J. Sliwkowski, Irondequoit, N.Y., assignor to Bausch & Lomb Incorporated, Rochester, N.Y., a corporation of New York
Filed Dec. 12, 1966, Ser. No. 600,911
Int. Cl. H03k 13/02
U.S. Cl. 340—347                 14 Claims

ABSTRACT OF THE DISCLOSURE

A function generator circuit for generating a quantized or incremental stepping signal that is a function of the analog signal applied thereto. The function generator circuit is particularly adapted for use in analog-to-digital converter circuits for providing a digital signal that is a direct or logarithmic function of the ratio of the amplitudes of two analog signals.

BACKGROUND OF THE INVENTION

Field of the invention

This invention pertains to a function generator circuit for generating a linear or exponential quantized or incremental stepping signal. The function generator is disclosed as a portion of an analog-to-digital converter circuit that is particularly adapted for use with photometric apparatus for providing a digital signal corresponding to the transmission, absorption or concentration of a test sample.

Description of the prior art

The use of digital readouts for various instruments is becoming increasingly popular since these readouts provide a simple and rapid means of accurately observing measurements, calibrations, control point setting, etc. An operator need merely observe the reading displayed by the digital readout without the need of interpolating between scale markers as general required in the meter type or analog indicating devices.

Direct readout displays are particularly useful in automated apparatus, such as photometric apparatus used in clinical laboratories, wherein a large number of samples are tested on a continuous basis. With digital readouts, the operator merely inserts the sample and observes the results in a decimal type display. In the majority of the presently available clinical laboratory apparatus, such as spectrophotometers, radiation is applied to test samples and measurements are made from analog type displays, such as meters and recorders, to determine the percent of radiation transmitted through, or absorbed by the sample. Computations are often made from these readings to determine the concentration of substance in the sample. This entails a tedious and time consuming logarithmic computation which is a possible source of error due to poor operator judgment in making readings and mistakes in the mathematical computations. It would be highly advantageous to provide such photometric apparatus with an analog-to-digital converter, or an accessory adapted to be employed with the photometric apparatus, for automatically converting the analog data into digital data, in a direct and/or logarithmic relation. This would greatly increase the accuracy of the apparatus, increase its capability, and simplify the procedure for such analysis.

It is therefore an object of this invention to provide a new and improved function generator circuit for providing a quantized or incremental stepping signal that is a direct and/or exponential function of a signal applied thereto.

It is also an object of this invention to provide a new and improved function generator circuit for use in an analog-to-digital circuit for converting the ratio of the amplitudes of two analog voltages into a digital signal.

It is also an object of this invention to provide a new and improved analog-to-digital converter circuit for converting an analog signal into direct and/or logarithmic digital form.

It is also an object of this invention to provide a new and improved analog-to-digital converter circuit particularly adapted for use to photometric apparatus for converting an analog measurement into digital form.

It is also an object of this invention to provide a new and improved analog-to-digital converter circuit adapted to use with spectrophotometers and the like for converting an analog signal corresponding to a radiation transmission, absorbance or concentration reading into digital form.

SUMMARY OF THE INVENTION

The function generator circuit of the invention includes a first and a second sampling circuit. Each sampling circuit includes an output circuit with a storage element, an input circuit, switching means coupled between the input and output circuits and a feedback circuit coupled between the input and output circuits. Circuit means, including an element having a predetermined gain, couples the first and second sampling circuits in a closed loop. A signal is applied to the sampling circuits to alternately actuate the switching circuits for periodically transferring a signal from a storage element in one sampling circuit to a storage element in another sampling circuit. A reference signal is applied to one of the sampling circuits. A quantized or incremental stepping signal is generated by each of the sampling circuits that is a function of the mode of the application of the reference signal. If the reference signal is applied continuously, the quantized or incremental stepping signal approaches that of a linear staircase. If the reference signal is applied momentarily, the quantized or incremental stepping signal assumes an exponential function.

The slope of the linear quantized or incremental stepping type signal is a function of the amplitude of the continuously applied reference signal. The exponential quantized or incremental stepping signal is a function of the gain of the element coupling the sampling circuits in a closed loop and the amplitude of the momentarily applied reference voltage.

A further feature of the invention includes the connection of the function generator circuit in an analog-to-digital converter circuit. A summing circuit receives the quantized or incremental stepping signal from the function generator circuit and compares it with an analog signal to provide a difference signal. A detection circuit is coupled to a timing circuit and to the summing circuit and is responsive to a predetermined range of the difference signal to generate a periodic switching signal at a rate controlled by the timing circuit when the difference signal is beyond the predetermined range. The function generator circuit is coupled to the detector circuit so that the periodic switching signals alternately actuate the switching circuits in the sampling circuits. A counting circuit coupled to the detector circuit counts the periodic switching signals and provides an indication that is a function of the ratio of the amplitudes of the reference signal and the second analog signal. As previously mentioned, by applying a continuous signal to the function generator a linear staircase function is generated so that the number of counts received by the counter circuit is a linear function of the ratio of the amplitudes of the reference and second signal. On the other hand, if only a momentary reference voltage is applied, the number of counts recorded by the counting circuit will be a logarithmic function of the ratio.

The analog-to-digital converter circuit is particularly adapted for use in photometric apparatus wherein the analog signal corresponds to the amount of radiation transmitted through a test sample. The reference voltage for the analog-to-digital converter circuit is, for example, a calibration signal in the case of single beam photometric apparatus, or a signal corresponding to the amount of radiation transmitted through a reference sample in the case of double beam photometric apparatus.

DESCRIPTION OF THE PREFERRED EMBODIMENT

Figure 1:
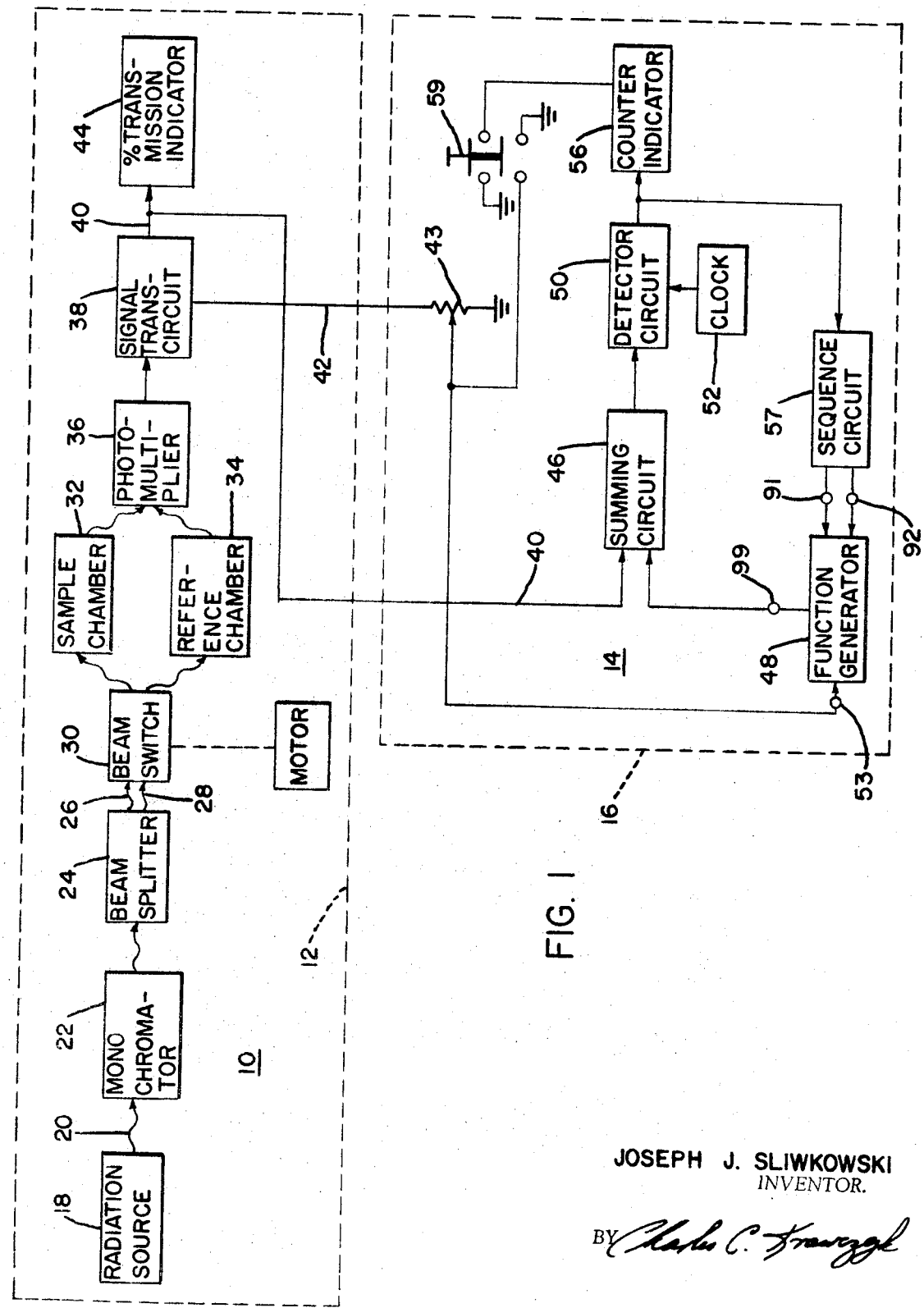
FIG. 1 is a block diagram of a double beam spectrophotometer with a digital readout including the invention.

FIG. 1 is an illustration of a block diagram of a conventional double beam spectrophotometer 10 (enclosed within the dash block 12) with an analog-to-digital converter circuit 14 including the invention (enclosed within the dashed block 16) for providing readings of transmission, absorption and/or concentration in digital form. The spectrophotometer 10 includes a radiation source 18 generating and directing a beam of radiation 20 through a monochromator 22 and a beam splitter 24 to form two beams of radiation 26 and 28. The beams 26 and 28 are directed through a motor driven beam switch 30 that alternately applies a beam of radiation through a test sample chamber 32 and a reference sample chamber 34 to a photomultiplier tube 36.

The photomultiplier tube 36 generates alternate sample and reference pulses having an amplitude directly related to the radiation transmission characteristics of the test and reference samples, respectively. The signal from the photomultiplier tube 36 is applied to a signal translating circuit 38 which conventionally processes the signal to develop a direct current signal 40 having a magnitude corresponding to the transmission characteristic of the test sample and to develop a second direct current signal 42 developed across a potentiometer 43 having a magnitude corresponding to the transmission characteristics of the reference sample. The signal 40 is applied to an analog readout device 44 that provides a visual indication of the percent of transmission of the test sample. Spectrophotometers of this type are well known in the art and do not require any further explanation.

The analog-to-digital converter circuit 14 may for example form a portion of the spectrophotometer 10 or can be a separate accessory that can be used with the spectrophotometer. The analog-to-digital converter circuit 14 includes a summing circuit 46 that receives the analog signal 40 and compares the magnitude of the signal 40 to the magnitude of a quantized or incremental stepping type signal generated at the output terminal 99 of a function generator circuit 48 and applies the difference therebetweeen to a detector circuit 50. The detector circuit 50 determines when the difference signal from the summing circuit 46 is within a predetermined range and/or polarity.

A clock circuit 52 is coupled to the detector circuit 50 so that a pulse type switching signal is generated by the detector circuit 50 when the difference signal from the summing circuit 46 is beyond the predetermined range or polarity. When the difference signal is within the predetermined range or polarity the detector circuit 50 stops generating any further switching pulses. The switching pulses are applied to a counter-indicator device 56 to provide a digital readout, and are also coupled through a sequencing circuit 57 to the input terminals 91 and 92 of the function generator circuit 48 to provide the switching signals for operation. A signal input terminal 53 of the function generator circuit 48 is coupled through a potentiometer 43 to the signal translating circuit 38 to receive the reference signal 42. The signal applied to the input terminal 53 controls the incremental signal generated by the function generator circuit 48. A double push button 59 is coupled to the counter-indicator 56 to simultaneously provide a reset signal for the counter-indicator 56 and a zero signal input to the function generator circuit 48.

Figure 2:
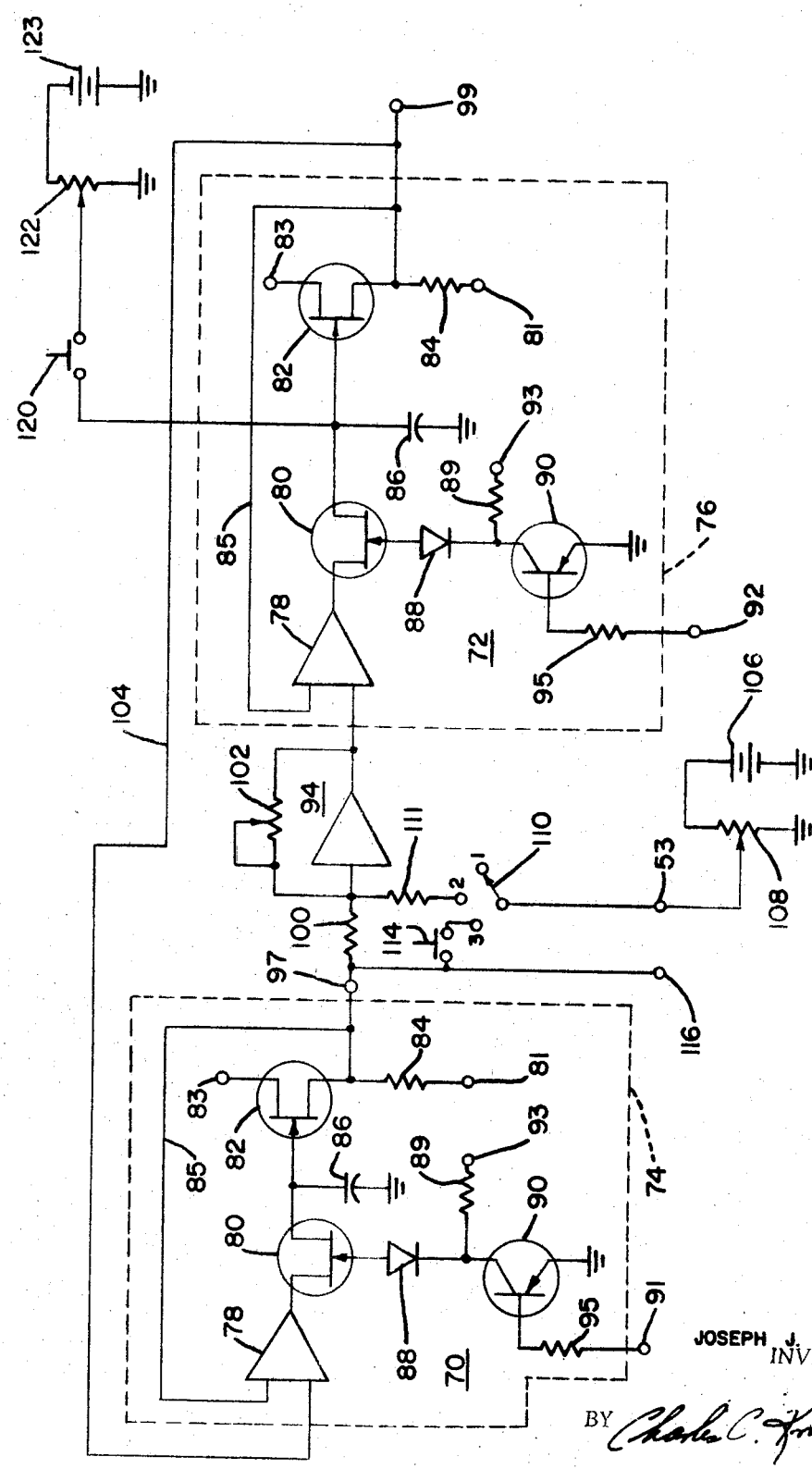
FIG. 2 is a schematic diagram of the function generator circuit of FIG. 1.

The function generator circuit 48, as illustrated in FIG. 2, includes two sampling circuits 70 and 72 enclosed within the dashed blocks 74 and 76, respectively. Each of the sampling circuits includes a summing amplifier 78 having two input circuits and an output circuit. The output circuit of the summing amplifier 78 is coupled through the source and drain electrodes of a field-effect transistor 80, connected as a switching circuit, to a gate electrode of a second field-effect transistor 82. The drain and source electrodes of the transistor 82 are coupled between the terminals 81 and 83 (adapted to be connected to a source of energizing potential) in a source-follower type circuit including a source resistor 84. A capacitor 86 is coupled between the gate electrode and ground and functions as a signal storage element for the sampling circuits. The voltage developed across the source resistor 84 is fed back by the connection 85 to one of the input circuits of the summing amplifier 78.

The gate electrode of the transistor 80 is coupled through a diode 88 to a collector electrode of a transistor 90. The emitter electrode of the transistor 90 is connected to ground while the collector electrode is connected through a resistor 89 to a terminal 93 (adapted to be connected to a source of energizing potential). The base electrode of the transistor 90 of the switching circuits 70 and 72 are connected to the input terminals 91 and 92, respectively, through a current limiting resistor 95 to receive a switching signal to render the transistors 90 conductive. When the transistor 90 is conductive the transistor 80 effectively operates as a switch to provide a low impedance path between the summing amplifier 78 and the capacitor 86. Accordingly, in response to a switching signal applied to the sampling circuit the voltage appearing at the output of the summing amplifier 78 is applied to charge the connected capacitor 86.

A voltage corresponding to the charge on the capacitor 86 is develop across the source resistors 84 of the sampling circuits 70 and 72 and is coupled to the output terminals 97 and 99, respectively. The feedback signal applied to an input circuit of the summing amplifier 78 (through the connection 85) functions to adjust the voltage levels in the circuit so that the signal developed at the terminals 97 and 99 is substantially equal to the signal applied to the other input circuit of the respective summing amplifier 78.

The output terminal 97 is coupled to an input circuit of the summing amplifier 78 of the sampling circuit 72 through a variable gain amplifier circuit 94. The gain of the amplifier circuit 94 is determined by the ratio of the resistance of the feedback potentiometer 102 to the size of an input resistor 100. The signal developed at the output terminal 99 is fed back to the other input circuit of the summing circuit 78 of the sample circuit 70 through a connection 104.

The function generator circuit 48 generates a quantized or incremental stepping signal at the output terminals 97 and 99 that can be linear or logarithmic depending upon the manner in which a reference signal is applied to the function generator circuit. For example, if a source of reference signal generated by the parallel circuit including a source 106 (illustrated as a battery) and a potentiometer 108 is applied through the input terminal 53, a switch 110 (when in the position 2) and a resistor 111 to the input of the amplifier 94, a linear staircase function is developed as illustrated, for example, by the curve 112 of FIG. 4. On the other hand, if the switch 110 is in position 3 so that the reference voltage is momentarily applied through a push button switch 114 to the input resistor 100, or by a signal pulse applied to the terminal 116, the function generator circuit generates a logarithmic incremental or stepping type signal as illustrated, for example, by the curve 118 of FIG. 4. In either case, logarithmic or linear, the incremental signal generated by the function generator can be increasing (positive) or decreasing (negative) as explained in a later portion of the specification.

The amplifiers 78 have a low output impedance so that when the transistors 80 are rendered conductive (effectively a low impedance) the capacitor 86 is charged to the output voltage developed by the amplifier 78. The transistor 82 acts as a very high input impedance circuit allowing the capacitor to store the charge applied thereto for long periods of time relative to the switching signals. The voltage across the source resistor 84 equals the voltage across the capacitor 86 less the gate-to-source drop of the transistor 82. This voltage is fed back to the amplifier 78 in a manner wherein the voltage across the capacitor 86 changes in a manner so that the voltage across the resistors 84 is substantially equal to that applied to the other input circuit of the amplifier 78. In effect, the sample circuits 70 and 72 receive and hold an output signal at their output terminals 97 and 99 equal to that applied to an input circuit of the summing amplifiers 78.

Figure 4:
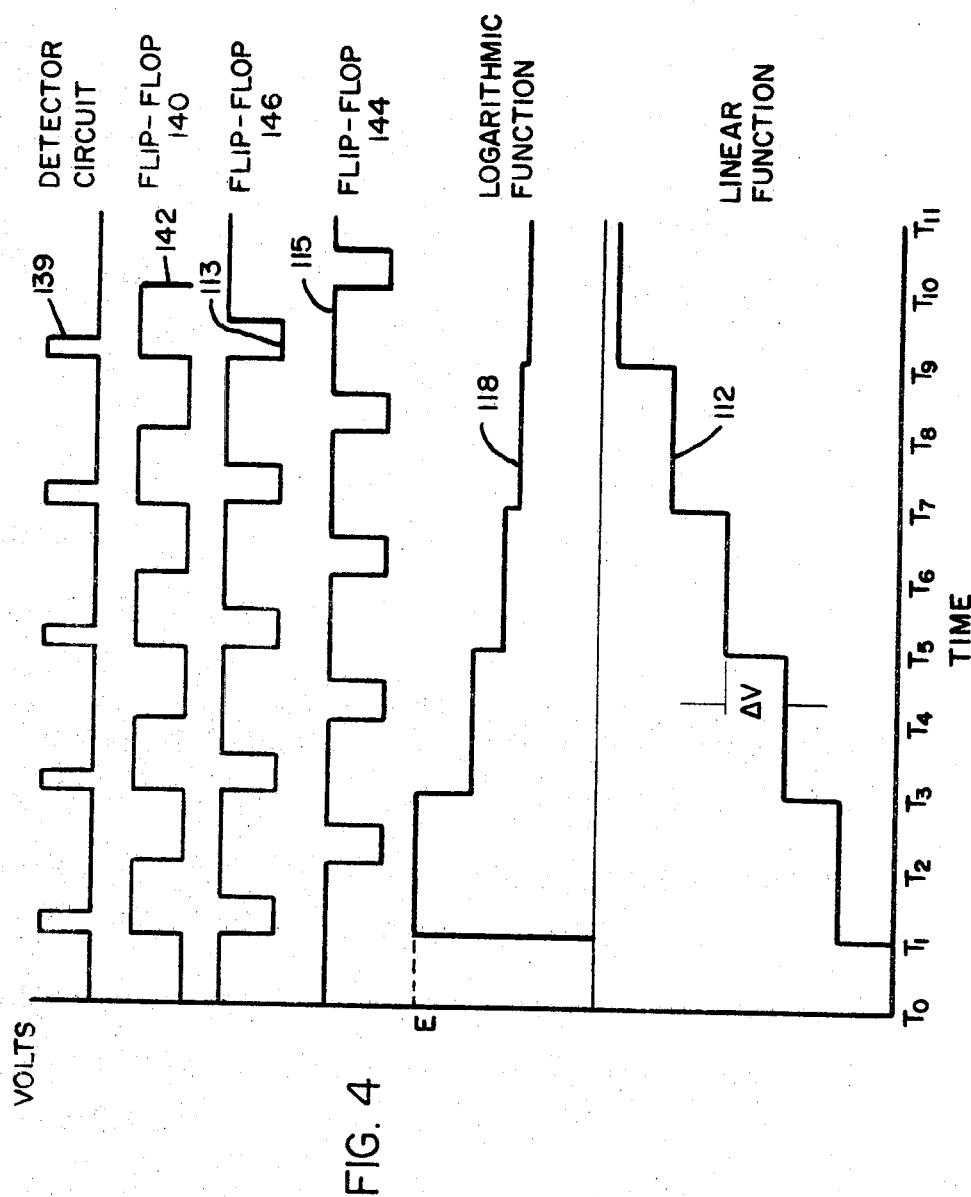
FIG. 4 is a plot of the various signals generated by the function generator of FIG. 2 and the analog-to-digital converter circuit of FIG. 3.

The switching signals for the function generator circuit are illustrated by the curves 113 and 115 of FIG. 4 and are applied to the terminals 92 and 91, respectively. The curves of FIG. 4 are plotted as a function of time designated by the switching periods $T_1$, $T_2$, etc. If the function generator circuit 48 is to generate a linear staircase function (curve 112), the value of the potentiometer 102 is set to equal the resistor 100. The size of the resistor 111 is selected so that the ratio of resistance of the potentiometers 102 over the resistance of the resistor 111 multiplied by the reference voltage equals the size of the step ($\Delta V$ in FIG. 4). It can be assumed that at the time $T_0$, the capacitors 86 in the sampling circuits 70 and 72 have a charge such that the output voltage at the terminals 97 and 99 is zero, and shortly before the time $T_1$, switch 110 is actuated to make connection with contact 2. At time $T_1$ a switching pulse (curve 113) is applied to the terminal 92 and the connected transistor 80 is rendered conductive to apply a charge to the capacitor 86 so that a voltage appears at the terminal 99 equal to $\Delta V$. At time $T_2$ a switching pulse (curve 115) is applied to the terminal 91 and the connected transistor 80 is rendered conductive to apply a charge to its capacitor 86 so that a voltage appears to the terminal 97 equal to $\Delta V$. The summing amplifier at this time totals the input applied to the resistors 100 and 111 to apply a voltage of $2\Delta V$ to the summing amplifier 78 of the sampling circuit 72. At time $T_3$, the capacitor in the sampling circuit 72 is charged so that the voltage appearing at the output terminal 99 equals $2\Delta V$. The circuit continues to function in this manner to provide the increasing or positive staircase function 112.

If on the other hand, the staircase function is to be a decreasing, or negative function, a voltage substantially greater than $\Delta V$ is momentarily applied to the capacitor 86 of the sampling circuit 72 through a pushbutton 120 connected to a movable arm of a potentiometer 122. The potentiometer 122 is coupled to a potential source 123 (illustrated as a battery). The polarity of the voltage applied from the source 123 is opposite that applied from the source 106. In this case, the voltage of the output terminal 99 initially equals the voltage from the source 123 and then periodically decreases by the value $\Delta V$.

If the function generator circuit 48 is to generate an incremental exponential function (curve 118), the capacitor 86 of the sampling circuit 72 is initially momentarily charged to a predetermined value. This is accomplished by momentarily closing the pushbutton 120 or positioning the selector switch 110 to the position 3 and momentarily depressing the pushbutton 114. The ratio of the resistance of the potentiometer 102 over the resistance of the resistor 100 is set to provide the correct amplifier gain to generate the desired exponential function. By setting the gain of the amplifier circuit 94 to be equal to value of the desired exponential function i.e. $e=-\Delta T/\tau$ (less than unity) voltage on the terminal 99 is of an incremental negative exponential form (curve 118). On the other hand, if the gain is set to be greater than unity, the voltage generated at the terminal 99 is of an incremental positive exponential form.

For example, assume the capacitor 86 of the sampling circuit 72 is initially charged so that the voltage at the output terminal at time $T_1$ is a value E. At the time $T_2$ a switching pulse (curve 115) is applied to the terminal 91 so that the voltage E appears at the output terminal 97 of the sampling circuit 70. The voltage E is amplified by the amplifier circuit 94 by a gain K so that at the time $T_3$ the voltage KE is developed at the output terminal 99. At the time $T_4$ the signal KE is developed at the output terminal 97 of the sampling circuit 70 and amplified again by the amplifier circuit 94 by the gain K so that at the time $T_5$ the voltage of $K^2E$ appears at the terminal 99. The process continues so that the signal generated at the output terminal 99, as measured as a function of time, takes the exponential form of E, KE, $K^2E$, $K^3E$ ... $K^NE$. It is obvious if K is greater than unity, the exponential function is positive and if less than unity, it is negative.

It should be noted that the operation of the function generator circuit 48 is not dependent upon any resistance-capacitive (R-C) time constant to provide the exponential function. Accordingly, there are no critical time constants in the function generator circuit of the invention. The various components in the circuit can vary widely in value without noticeably affecting the operation of the circuit.

Figure 3:
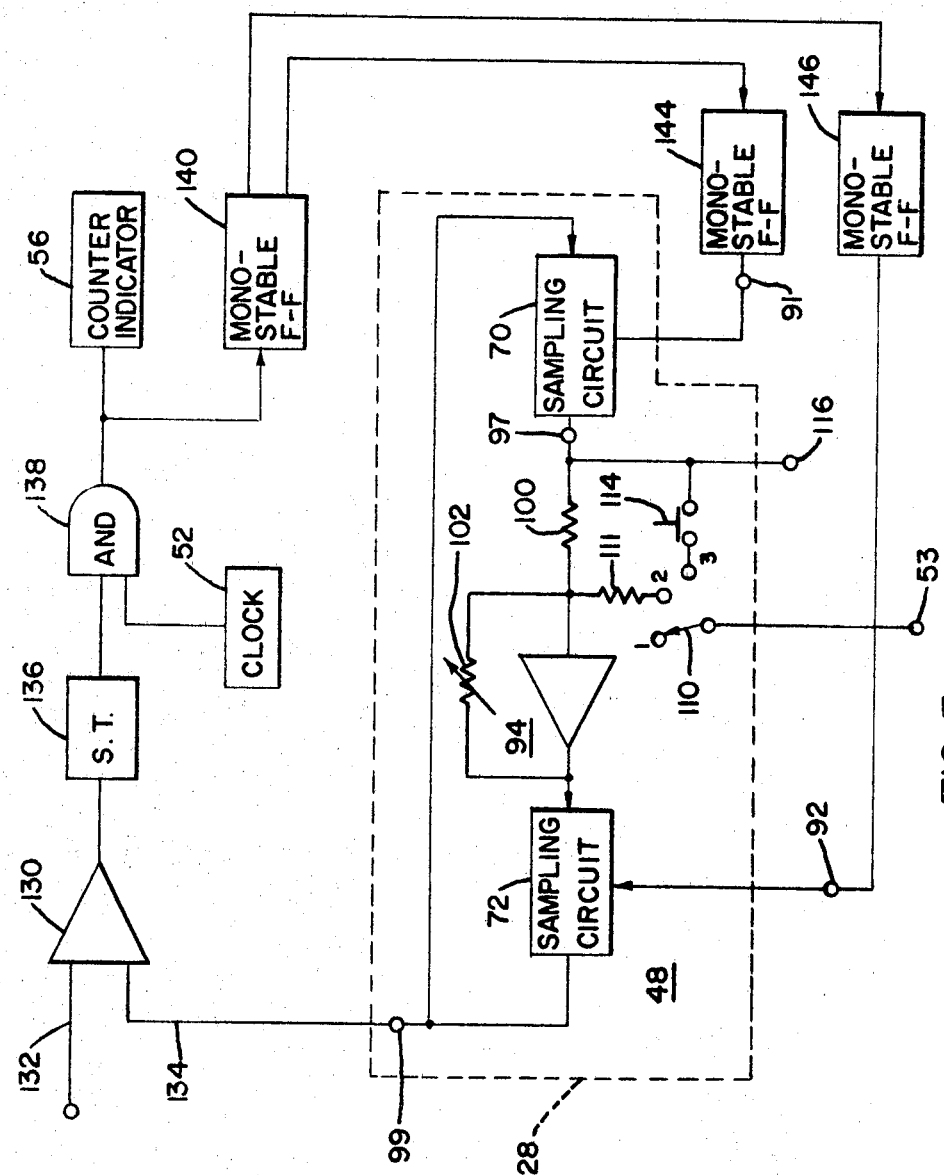
FIG. 3 is an expanded block diagram of the analog-to-digital converter circuit of FIG. 1.

In FIG. 3, the function generator circuit 48 (enclosed with the dashed block 128) is connected as a portion of a feedback loop in the analog-to-digital circuit 14. The analog-to-digital converter circuit includes a summing amplifier 130 including a first input circuit 132 adapted to receive the analog signal to be converted and a second input circuit 134 connected to the output terminal 99 of the function generator 48. The summing amplifier 130 compares the amplitude of the analog signal with the amplitude of the incremental stepping signal from the function generator circuit to apply a difference signal to a Schmitt trigger circuit 136.

The Schmitt trigger circuit 136 is conventionally connected to generate an output signal when the difference signal applied thereto is beyond a predetermined range or level of signals. For example, the Schmitt trigger circuit 136 can be connected to provide an output signal when the difference signal is above a minimum voltage or is of a given polarity. The output signal from the Schmitt trigger circuit 136 is applied to a first input circuit of an AND gate 138. The other input circuit of the AND gate 138 is connected to the clock circuit 52 so that pulses synchronized with the clock circuit 52 pass through the gate during the presence of a signal from the Schmitt trigger circuit 136 at the other input circuit, as illustrated by the curve 139 of FIG. 4. The output from the AND gate circuit 138 is coupled to the conventional counter-indicator 56 and to a first mono-stable flip-flop circuit 140.

In response to the timing pulses, the flip-flop circuit 140 generates the pulse type signal 142, as illustrated in the FIG. 4, having a time duration approximately equal to one half the period between the pulses of the curve 139. One output circuit of the flip-flop 140 is coupled to a mono-stable flip-flop circuit 144 while the other output circuit to a mono-stable flip-flop 146. The flip-flop circuits 144 and 146 respond to the signals generated by the flip-flop 140 to generate the switching signals 115 and 113 of FIG. 4, respectively. The output circuits of the flip-flop circuits 144 and 146 are connected to the function generator terminals 91 and 92, respectively. A reference signal is applied to the input terminal 53 of the function generator circuit in a manner as previously described with regards to FIG. 2 depending upon the type of incremental stepping signal to be generated.

In operation, the function generator circuit 48 continues to generate an incremental stepping signal, until the difference signal from the summing amplifier 130 falls within the pre-determined range or level of signals or the signal polarity changes (depending upon the operation of the Schmitt trigger circuit). At this time, the signal developed by the Schmitt trigger 136 is removed from the AND gate 138 so that no further timing pulses are applied to the counter-indicator 56 and the mono-stable flip-flop circuit 140. The number of timing pulses passed by the AND gate 138 and counted by the counting indicator circuit 56 provides a digital signal corresponding to the linear or logarithmic ratio between the analog signal applied to the input terminals 132 and the reference signal applied to the function generator 48.

In the double beam spectrophotometer 10 of FIG. 1, the percent transmittance of an unknown sample (signal 40) is expressed by Equation 1, $$T = T_R/T_S \quad \text{(Eq. 1)}$$

where $T$ = percent transmittance compared to the reference sample
$T_R$ = amount of transmission through the reference chamber 34
$T_S$ = amount of transmission through the sample chamber 32

When a digital reading of transmission is desired, a standard sample is placed in both the sample chamber 32 and the reference chamber 34. The potentiometer 102 (FIG. 3) is set to equal the resistor 100 to provide a unity gain for the amplifier circuit 94 and the switch 110 set at the position 2. The pushbutton 59 is momentarily depressed and the potentiometer 43 (FIG. 1) is adjusted to provide a reading of 100 corresponding to 100% transmission. The unknown samples can now be placed in the sample chamber 32 and the transmission (T) is indicated by momentarily closing the pushbutton 59.

Absorbance is defined as the logarithm of the reciprocal of the transmittance. This is expressed as:

$$A = \log_{10} 1/T \quad \text{(Eq. 2)}$$

where $A$ = absorbance

The relation between absorbance and concentration is expressed by Equation 3.

$$C = K_1 A \quad \text{(Eq. 3)}$$

$K_1$ = a constant (characterized by the particular solution being analyzed)
$C$ = concentration Combining Eq. 2 with Eq. 3 we have:

$$C = K_1 \log_{10} 1/T \quad \text{(Eq. 4)}$$

When analyzing the sample for absorbance or concentration, the switch 110 (FIG. 3) is set on position 3. The analog-to-digital converter 14 is adjusted for a zero reading by positioning blank samples (samples that do not have the substance to be analyzed) in both the sample chamber 32 and the reference chamber 34. The pushbuttons 59 and 114 are sequentially momentarily closed and the potentiometer 43 is adjusted for a zero reading in the counter-indicator 56. Subsequently, a standard sample having a known absorption factor or concentration of the substance being analyzed is positioned in the sample chamber 32 and the pushbuttons 59 and 114 are sequentially depressed. The potentiometer 102 is set to provide a digital reading corresponding to the absorbance or concentration to the standard sample. The unknown samples can now be placed in the sample chamber 32 and a digital reading of the absorbance or concentration (depending upon the test to be made) is indicated on the counter-indicator 56 when the pushbuttons 59 and 114 are sequentially momentarily closed.

What is claimed is:

1. A function generator circuit for generating an incremental stepping signal comprising:

first and second sampling circuits each generating incremental stepping signals and including an input circuit, an output circuit having a signal storage element, a switching circuit serially connected with said signal storage element coupled between said input circuit and said output circuit, and a feedback circuit coupled between said input circuit and said output circuits;

first circuit means coupled between the first sampling circuit output circuit and said second sampling input circuit having a predetermined gain;

second circuit means coupled between said second sampling circuit output circuit and said first sampling circuit input circuit completing a closed loop between said first and second sampling circuits;

third circuit means for applying a reference signal to said storage element in said second sampling circuit; and fourth circuit means for alternately actuating said switching circuit in said first and second sampling circuit whereby the incremental stepping signal which is a function of said reference signal appears at said second sampling output circuit.

2. The electrical circuit as defined in claim 1, wherein said third circuit means momentarily applies said reference signal whereby the incremental stepping signal at said output circuit of said second sampling circuit is an exponential function of said reference signal.

3. The electrical circuit as defined in claim 2, wherein said first circuit means comprises an amplifier circuit having a predetermined gain determinative of the exponential function.

4. The electrical circuit as defined in claim 1, wherein said third circuit means continuously applies said reference signal whereby the signal at said second sampling output circuit is a linear staircase function of said reference signal.

5. The electrical circuit as defined in claim 4, wherein said first circuit means comprises an amplifier circuit having a unity gain and the magnitude of each step in the signal at the second sampling output circuit is a function of the amplitude of said reference signal.

6. The electrical circuit as defined in claim 1, wherein said signal storage means comprises a capacitive circuit.

7. An electrical circuit comprising:

first and second summing circuits, each including a plurality of input circuits and an output circuit;

first and second amplifier circuits, each having an input circuit with a signal storage element and an output circuit;

first and second switching means coupled between said input circuits of said first and second amplifier circuits and the output circuits of said first and second summing circuits, respectively;

feedback circuit means coupled between the output circuits of said first and second amplifiers and an input circuit of said first and second summing circuits, respectively;

circuit means coupled between the output circuit of said second amplifier and another of said input circuits of the first summing circuit;

a third amplifier circuit coupled between the first amplifier output circuit and another of said input circuits of said second summing circuit; and means for alternately actuating said first and second switching means.

8. The electrical circuit as defined in claim 7, wherein:
said signal storage element in said first and second amplifier circuit input circuits comprises a capacitor, and including
circuit means for applying a continuous direct current signal to said third amplifier circuit whereby a linear staircase function is generated by said electrical circuit.

9. The electrical circuit as defined in claim 7, wherein:
said signal storage element in said first and second amplifier circuit input circuits comprises a capacitor, and including
circuit means for momentarily applying a direct current signal to said electrical circuit whereby an incremental exponential signal is generated by said electrical circuit.

10. An analog-to-digital converter circuit comprising:
a function generator circuit for generating a varying amplitude incremental stepping signal at a rate determined by a periodic switching signal, the amplitude of the stepping signal is a function of an analog reference signal applied thereto;
circuit means coupled to said function generator circuit for generating said reference signal;
summing circuit means receiving said incremental stepping signal from said function generator and a second analog to signal for generating a difference signal;
timing circuit means providing a periodic clock signal;
detection circuit means coupled to said summing circuit means and said timing circuit means responsive to a predetermined range of signals from said summing circuit for generating a periodic switching signal at a rate that is a function of said clock signal rate;
circuit means for generating said periodic switching signals coupling said detector circuit means to said function generator circuit, and
counting means coupled to said detection circuit means counting said periodic switching signals for generating a digital signal which is a function of the ratio of said reference signal and said second analog signal.

11. The analog-to-digital converter circuit as defined in claim 10, wherein:
said function generator comprises first and second sampling circuits, each including a storage element and a switching circuit responsive to said switching signals for applying a signal to said storage element, and circuit means connecting said first and second sampling circuits in a closed loop circuit whereby a signal from the storage element of said first sampling circuit is transferred to the storage element of said second sampling circuit during a first period and a signal from the storage element in the second sampling circuit is transferred to the storage element in said first sampling circuit during a second period, the signal developed by said summing circuit comprising a series of steps.

12. An analog-to-digital converter circuit comprising:
a function generator circuit for generating an incremental stepping signal, the varying magnitude of the steps in said signal being a function of the amplitude of an applied first direct current signal;
an input circuit for receiving a second direct current signal;
first circuit means coupled to said function generator circuit and said input circuit for comparing the magnitude of said incremental stepping signal with said second direct current signal to develop a difference signal;
second circuit means for generating a continuous series of sequential pulses;
an amplitude sensitive detection circuit coupled to said first circuit means for generating an output signal when the amplitude of said difference signal applied thereto is outside a predetermined amplitude range;
a switching circuit including first and second input circuits for generating an output signal in response to a signal applied to said first and second input circuits;
third circuit means coupling said first and second input circuits to said second circuit means and said amplitude sensitive detector circuit, respectively, whereby said switching circuit generates output signal pulses at a rate determined by said second circuit means when the amplitude of the difference signal is outside said predetermined amplitude range;
circuit means coupling said switching circuit to said function generator circuit whereby said function generator circuit generates said incremental stepping signal and said switching circuit generates output signal pulses, and
a counting circuit coupled to said switching circuit for counting said output pulses generated by said switching signal.

13. The analog-to-digital converter circuit as defined in claim 12 wherein:
said function generator circuits generates an incremental stepping signal, the magnitude of the steps changing at an exponential rate, and
said counting circuit counts a number of switching circuit output pulses corresponding to a logarithmic ratio of the amplitudes of said first and second direct current signals.

14. The function generator circuit as defined in claim 1, further including:
summing circuit means receiving said incremental stepping signal from said function generator and second analog signal for providing a difference signal;
timing circuit means providing a periodic clock signal;
detection circuit means coupled to said summing circuit means and said timing circuit means responsive to a predetermined range of signals from said summing circuit for generating a periodic switching signal at a rate that is a function of said clock signal rate;
circuit means coupling said detector circuit means to said function generator circuit for applying said periodic switching signals thereto, and
counting means coupled to said detection circuit means counting said periodic switching signals to provide a digital indication that is a function of the ratio of said reference signal and said second analog signal.

References Cited
UNITED STATES PATENTS

| 2,871,378 | 1/1959 | Lohman | 307—227 |
| 2,918,574 | 12/1959 | Gimpel et al. | 328—186 |
| 3,062,442 | 11/1962 | Boensel et al. | 340—347 |
| 3,270,335 | 8/1966 | Hackett | 340—347 |
| 3,273,141 | 9/1966 | Hackett | 340—347 |
| 3,281,827 | 10/1966 | Olshausen et al. | 340—347 |
| 3,315,524 | 4/1967 | Duffy et al. | 307—327 |
| 3,408,595 | 10/1968 | Hillman | 307—227 |
| 3,421,020 | 1/1969 | Ringelhaan | 307—227 |

MAYNARD R. WILBUR, Primary Examiner

C. D. MILLER, Assistant Examiner

U.S. Cl. X.R.

235—197